United States Patent
Wu et al.

(10) Patent No.: US 11,699,027 B1
(45) Date of Patent: Jul. 11, 2023

(54) SYSTEMS AND METHODS FOR A COLLABORATIVE READING ASSISTANCE TOOL

(71) Applicant: Salesforce, Inc., San Francisco, CA (US)

(72) Inventors: Chien-Sheng Wu, San Jose, CA (US); Xiang Chen, San Francisco, CA (US); Tong Niu, Sunnyvale, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/749,804

(22) Filed: May 20, 2022

Related U.S. Application Data (60) Provisional application No. 63/299,952, filed on Jan. 15, 2022.

(51) Int. Cl.
*G06F 40/166* (2020.01)
*G09B 7/02* (2006.01)
*G06F 16/34* (2019.01)

(52) U.S. Cl.
CPC .......... *G06F 40/166* (2020.01); *G06F 16/345* (2019.01); *G09B 7/02* (2013.01)

(58) Field of Classification Search
CPC .................................................... G06F 16/345
See application file for complete search history.

(56) References Cited

U.S. PATENT DOCUMENTS

| | | | | |
|---|---|---|---|---|
| 7,886,235 | B2* | 2/2011 | Bornstein | G06F 40/103 715/802 |
| 2012/0210203 | A1* | 8/2012 | Kandekar | G06F 16/345 715/230 |
| 2021/0216579 | A1* | 7/2021 | Stelmar Netto | G06N 5/022 |
| 2022/0084524 | A1* | 3/2022 | Hou | G06F 16/31 |
| 2022/0327287 | A1* | 10/2022 | Agrawal | G06N 5/003 |

OTHER PUBLICATIONS

Andrea Bianchi et al., Designing a Physical Aid to Support Active Reading on Tablets, In Proceedings of the 33rd Annual ACM Conference on Human Factors in Computing Systems, 2015, 10 pages.
Derek Miller, Leveraging BERT for Extractive Text Summarization on Lectures, arXiv preprint arXiv:1906.04165, 2019, 7 pages.
Lidiya Murakhovs'ka et al, 2021. MixQG: Neural Question Generation with Mixed Answer Types, arXiv:2110.08175v1 [cs.CL] Oct. 15, 2021, 9 pages.

* cited by examiner

*Primary Examiner* — Asher D Kells
(74) *Attorney, Agent, or Firm* — Haynes and Boone, LLP (57) ABSTRACT

Embodiments described herein provide methods and systems for presenting a document and generating a human-AI summary. A system provides a user with a selection of an amount of time to spend reading the document, or a list of questions from which the user may select which questions they would like answered by reading the document. The system highlights sections of the document according to the user selection. Implicit and explicit user data such as dwell times, user highlights, and user notes, are collected while displaying the document. A human-AI summary is generated based on the document and the user data.

20 Claims, 10 Drawing Sheets

|  | Does this feature provide extra value? (1: not at all; 7: highly valuable) | | | | | | |
|---|---|---|---|---|---|---|---|
|  | 1 | 2 | 3 | 4 | 5 | 6 | 7 |
| Time Filter | 0 | 1 | 1 | 3 | 2 | 3 | 7 |
| Question Filter | 0 | 0 | 2 | 3 | 5 | 0 | 7 |
| Focus Mode | 0 | 0 | 0 | 2 | 3 | 6 | 6 |
| Reflection | 1 | 1 | 0 | 2 | 3 | 5 | 5 |
| AI-generated summary | 0 | 0 | 0 | 2 | 5 | 4 | 6 |
| Human-AI summary | 0 | 0 | 0 | 2 | 4 | 3 | 8 |
| Explanation of summary | 0 | 0 | 0 | 2 | 3 | 5 | 7 |

*FIG. 10*

|  | Does this feature require extra effort? (1: not at all; 7: high effort) | | | | | | |
|---|---|---|---|---|---|---|---|
|  | 1 | 2 | 3 | 4 | 5 | 6 | 7 |
| Time Filter | 5 | 4 | 5 | 2 | 0 | 1 | 0 |
| Question Filter | 5 | 4 | 3 | 1 | 3 | 1 | 0 |
| Focus Mode | 13 | 1 | 0 | 2 | 1 | 0 | 0 |
| Reflection | 6 | 4 | 1 | 2 | 3 | 1 | 0 |
| AI-generated summary | 11 | 4 | 1 | 0 | 1 | 0 | 0 |
| Human-AI summary | 6 | 8 | 0 | 0 | 2 | 1 | 0 |
| Explanation of summary | 7 | 5 | 3 | 1 | 0 | 1 | 0 |

*FIG. 11*

SYSTEMS AND METHODS FOR A COLLABORATIVE READING ASSISTANCE TOOL

CROSS REFERENCES

The present disclosure is a nonprovisional of and claims priority under 35 U.S.C. 119 to U.S. provisional application No. 63/299,952, filed on Jan. 15, 2022, which is hereby expressly incorporated by reference herein in its entirety.

TECHNICAL FIELD

The embodiments relate generally to machine learning systems and natural language processing (NLP), and specifically to systems and methods for collaborative reading assistance and summarization.

BACKGROUND

Natural language processing models have been widely used in many natural language processing tasks such as summarization, question answering, and/or the like. User's reading habits are evolving in response to the rise of social media and other information sources which provide small bits of information at a time. Many users find it difficult to read, comprehend, and retain information from longer documents. Therefore, there is a need for better systems and methods for reading assistance and summarization.

BRIEF DESCRIPTION OF THE DRAWINGS

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

In view of the need for a reading tool that improves user experience on reading a large amount of texts, embodiments described herein provide a collaborative reading tool that employs a suite of natural language processing (NLP) models1 to understand the text and then to provide guidance for the reader throughout the whole reading process.

Embodiments of the collaborative reading system may include a number of features in any combination. A time filter may allow a user to select an amount of time they have to read the article, and then the system highlights summative portions of the document that will take about that amount of time to read. This may be based on an average reading rate or individualized to the user. A question filter may present the user with a list of questions they potentially would like to have answered, and then highlights portions of the article that answers the selected questions. The list of questions may be generated by a model based on the text of the document, for example, one question may be generated for each paragraph of the document.

A focus mode may present one paragraph of the article at a time by blurring, dimming, or otherwise obscuring the other paragraphs. By only presenting one paragraph at a time, this allows the system to track how long a user spends on each paragraph (i.e., dwell time).Also included in focus mode may be the ability to highlight, take notes, and answer reflection questions which are generated by an NLP model. A Human-AI summary of the article may be generated in some embodiments. The summary may be based solely on the article itself or may also be based on metrics that indicate the relative importance to the reader of different paragraphs of the article, such as their dwell time on the paragraph.

In this way, a variety of benefits may be realized. A system may efficiently present information to a user in a personalized manner. For example, the generated summary based on metrics may generate a more salient summary tailored to the user. By measuring user inputs while the user is reading the document, the system avoids having to iterate multiple versions of the summary based on user feedback of the summary itself. This requires less after-the-fact computation time from the system since it can generate the summary without requesting additional feedback from a user. Further, by allowing the weighting of different metrics in how much they affect the generated summary, the system is more flexible than other summarization systems, allowing a single model, or fewer models, to be used to generate the summary in different ways based on user inputs, reducing the amount of memory required to achieve the desired flexibility.

Figure 1:
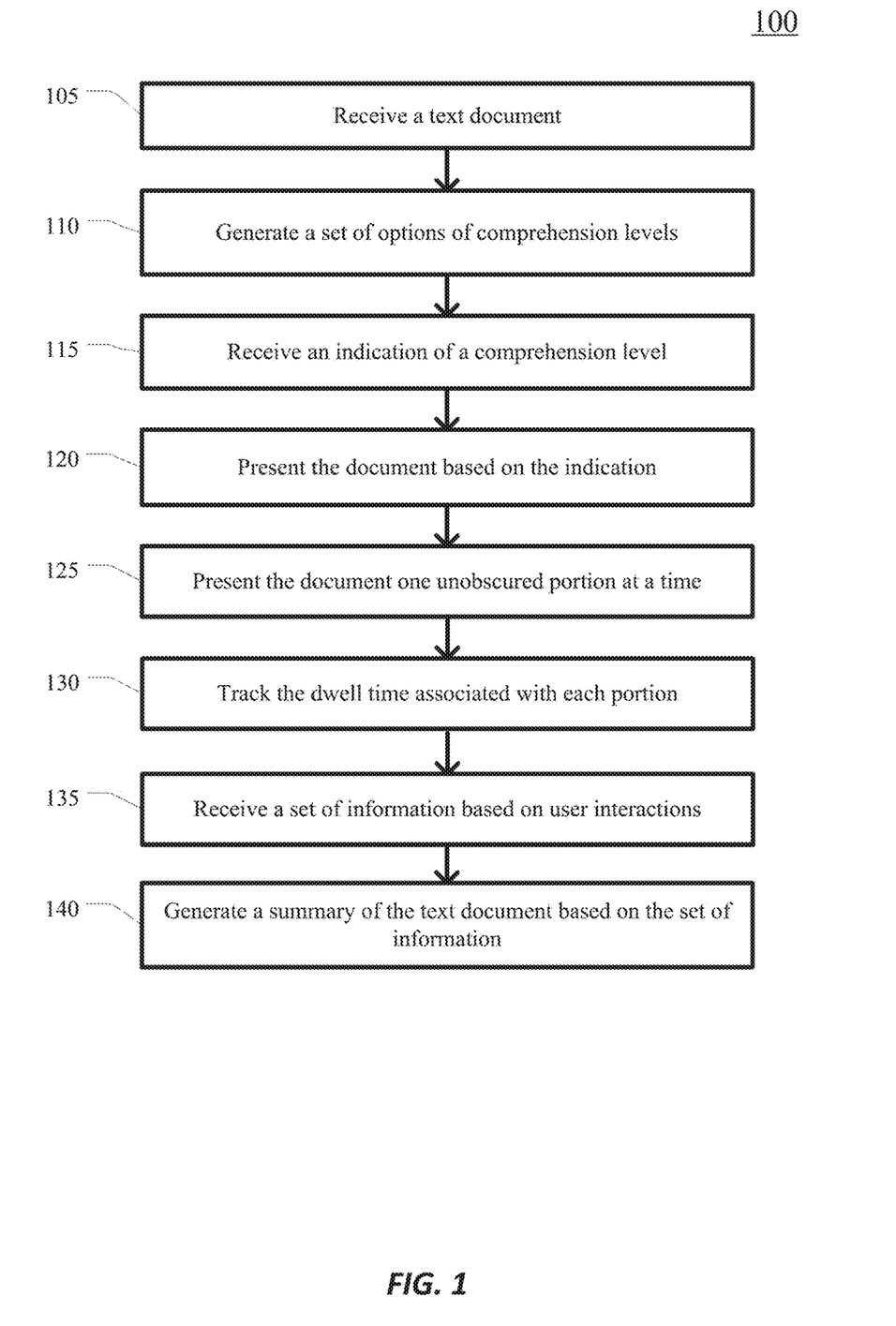
FIG. 1 provides an example logic flow diagram illustrating an example algorithm for customized document summarization, according to some embodiments.

FIG. 1 provides an example logic flow diagram 100 illustrating an example algorithm for customized document summarization, according to some embodiments. FIG. 1 provides a high level description of an embodiment of the system, which is described in more detail herein with reference to FIGS. 2-11. One or more of the processes described in FIG. 1 may be implemented, at least in part, in the form of executable code stored on non-transitory, tangible, machine-readable media that when run by one or more processors may cause the one or more processors to perform one or more of the processes 105-140. In some embodiments, method 100 may correspond to the method used by the reading tool module 630 in FIG. 6.

At step 105, a communication interface receives a text document. The text document may be, for example, an article on a website. The website may include other elements such as images, ads, etc. which the system may ignore when performing the functions described herein.

At step 110, a system generates a set of options of comprehension levels. In some embodiments, the options are times which a user may select corresponding to the amount of time they want to spend reading the text document. In some embodiments, the options are a list of questions associated with the document and a user may select which questions they would like to have answered. These may respectively be referred to as a time filter and a question filter. In some embodiments, a user may select whether they want to use a time filter or a question filter.

At step 115, the system receives an indication of a comprehension level. For example, a user may select an amount of time to read the document, or a subset of questions from the list of questions presented.

At step 120, the system presents the document based on the indication. In some embodiments, the system highlights portions of the document based on the indication. For example, if a user selected that they wanted to spend 10 minutes on an article, then certain portions of the document would be highlighted corresponding to an estimated reading time. If the user selected 15 minutes, then the system would highlight a larger portion of the text. In some embodiments, which portions of the text are highlighted is determined through the use of a natural language processing model.

At step 125, the system presents the document one unobscured portion at a time. For example, portions may be paragraphs of the document. While the user is reading, they may control the advance of which paragraph is unobscured so that they are able to focus on one paragraph at a time while the remainder of the document is obscured.

At step 130, the system tracks the dwell time associated with each portion. Since the user controls which portion of the document is unobscured, as they read, the system may track the amount of time each portion is unobscured, thereby determining an estimate of the amount of time the user spent reading that portion.

At step 135, the system receives a set of information based on user interactions. The set of information may include user-generated highlighting of portions of the document, and notes written by the user. There may also be implicit information such as the dwell time associated with each paragraph or other subdivision of the document.

At step 140, the system generates a summary of the document based on the set of information. In some embodiments, the system uses an AI model with the document itself, together with the set of information based on user interactions in order to generate the summary. This produces a combination human-AI summary which includes more information determined to be important to the user based on their interactions.

For example, the summarization model may be a generative summarization model that receives an input of the unobscured portions of the document, dwell time on each of respective portion, user notes and other user interaction parameters, and generate an output summary. This generative summarization model may be trained with document data and user interaction history supervised by a reference summary.

Figure 2:
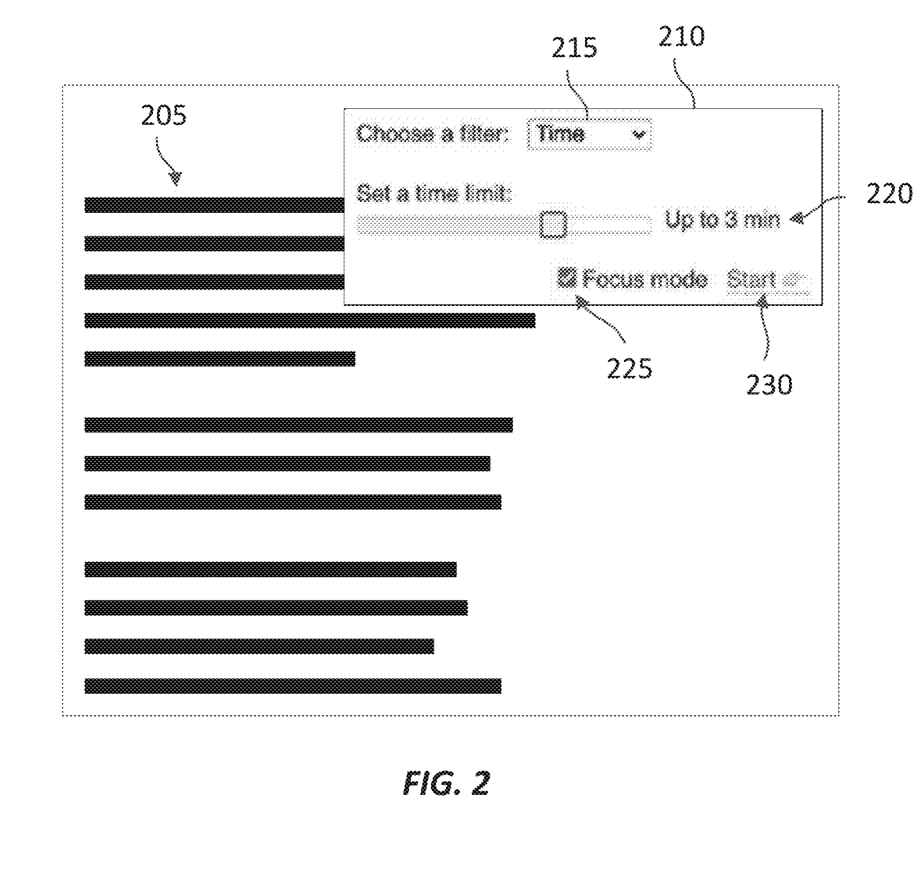
FIG. 2 illustrates an exemplary user interface for a time filter according to some embodiments.

FIG. 2 illustrates an exemplary user interface for a time filter according to some embodiments. The time filter prompt 210 may be presented on the screen together with the document text 205. The time filter prompt 210 may include a selection box 215 allowing the user to select between different filters (i.e., time filter and question filter). When time filter is selected, a user may be presented with input slider 220. Input slider 220 allows a user to adjust the amount of time they want to spend reading the article. In some embodiments, the system may first estimate the total amount of time required to read the entire article, and accordingly adjusts the allowable values of the slider input which allows the time selection to go up to the estimated length of time to read the entire document. In some embodiments, the input method is a text input or other method besides a slider.

Focus mode selector 225 allows a user to indicate if they want to read the document using focus mode, described in more detail below. Start button 230 allows the user to indicate that their selections have been made, and they are ready to begin reading the article. In response to the user clicking start button 230, the system may highlight or otherwise modify the presentation of the document the article according to the selections made by the user.

Figure 3A:
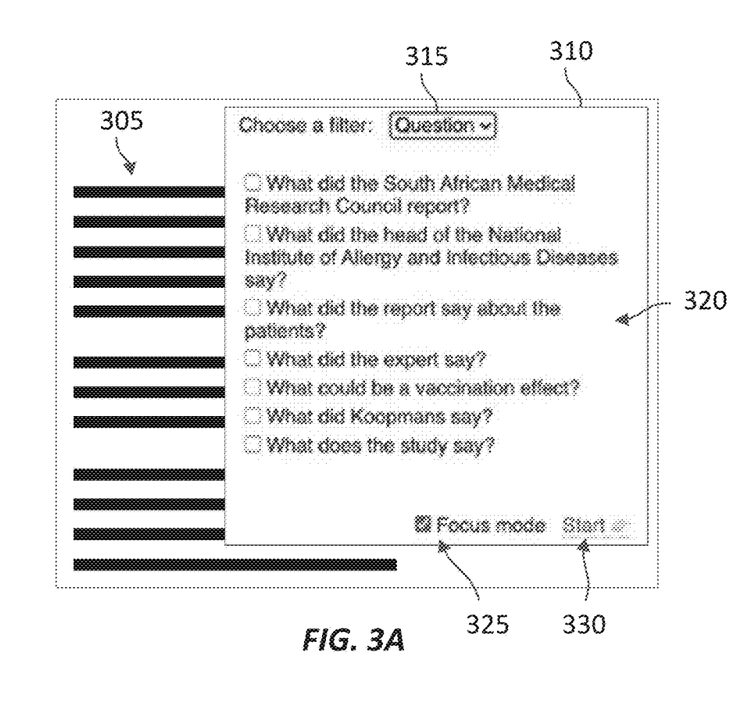
FIG. 3A illustrates an exemplary user interface for a question filter according to some embodiments.

FIG. 3A illustrates an exemplary user interface for a question filter according to some embodiments. The question filter prompt 310 may be presented on the screen together with the document text 305. The question filter prompt 310 may include a selection box 315 allowing the user to select between different filters (i.e., time filter and question filter). When question filter is selected, a user may be presented with a list of questions 320. List of questions 320 allows a user to select which of the questions they would like to have answered by reading the document. In some embodiments, the input method is a respective check box associated with each question on the list, although the selection method may be different, such as clicking directly on the text of each question. Based on the selection, the system may highlight sentences of the text which answer the selected questions. In some embodiments, hovering a cursor over the highlighted text brings up a tooltip showing the corresponding question that is answered by that highlighted text.

Focus mode selector 325 allows a user to indicate if they want to read the document using focus mode, described in more detail below. Start button 330 allows the user to indicate that their selections have been made, and they are ready to begin reading the article. In response to the user clicking start button 330, the system may highlight or otherwise modify the presentation of the document the article according to the selections made by the user.

Figure 3B:
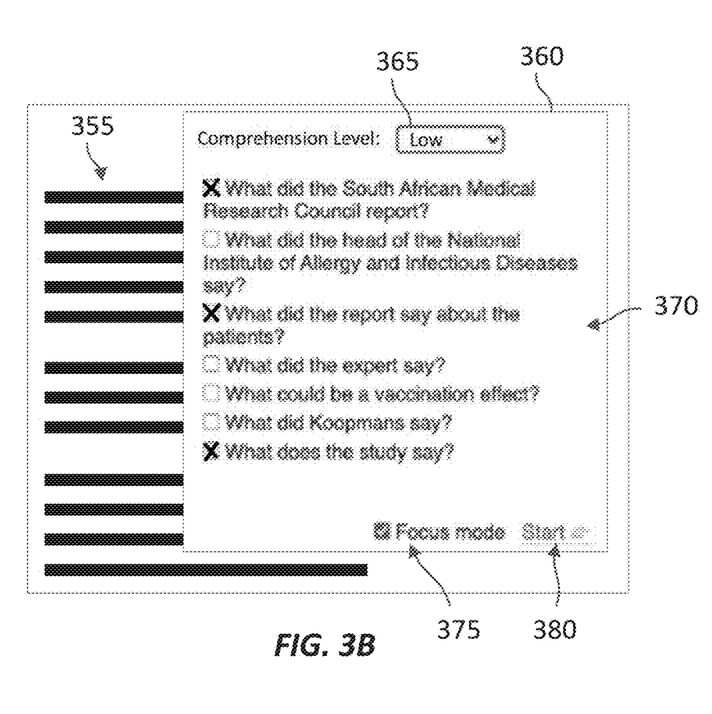
FIG. 3B illustrates an exemplary user interface for a comprehension level filter according to some embodiments.

FIG. 3B illustrates an exemplary user interface for a comprehension level filter according to some embodiments. The comprehension level prompt 360 may be presented on the screen together with the document text 355. The comprehension level prompt 360 may include a selection box 365 allowing the user to select between different comprehension levels. The comprehension level prompt 360 may present suggested questions 370 depending on a user preferred comprehension level of the article. For example, the comprehension level prompt 360 may suggest that questions such as "what did the South African Medical Research Council report?", "What did the report say about the patients?", and "What does the study say?" as an "low" level of comprehension, and questions such as "What could be a vaccination effect" and "What did the head of the National Institute of Allergy and Infectious Diseases say?" as an "intermediate" level of comprehension. The user may review the recommended questions and select a desired level of comprehension based on the questions that the user may want to understand. In this way, the user does not need to select and check the questions but rely on system recommended questions to achieve a level of comprehension. In some embodiments, a model determines the most salient questions to be answered based on the document and the selected comprehension level.

Focus mode selector 375 and start button 380 may work substantially the same as focus mode selector 325 and start button 330.

Figure 4:
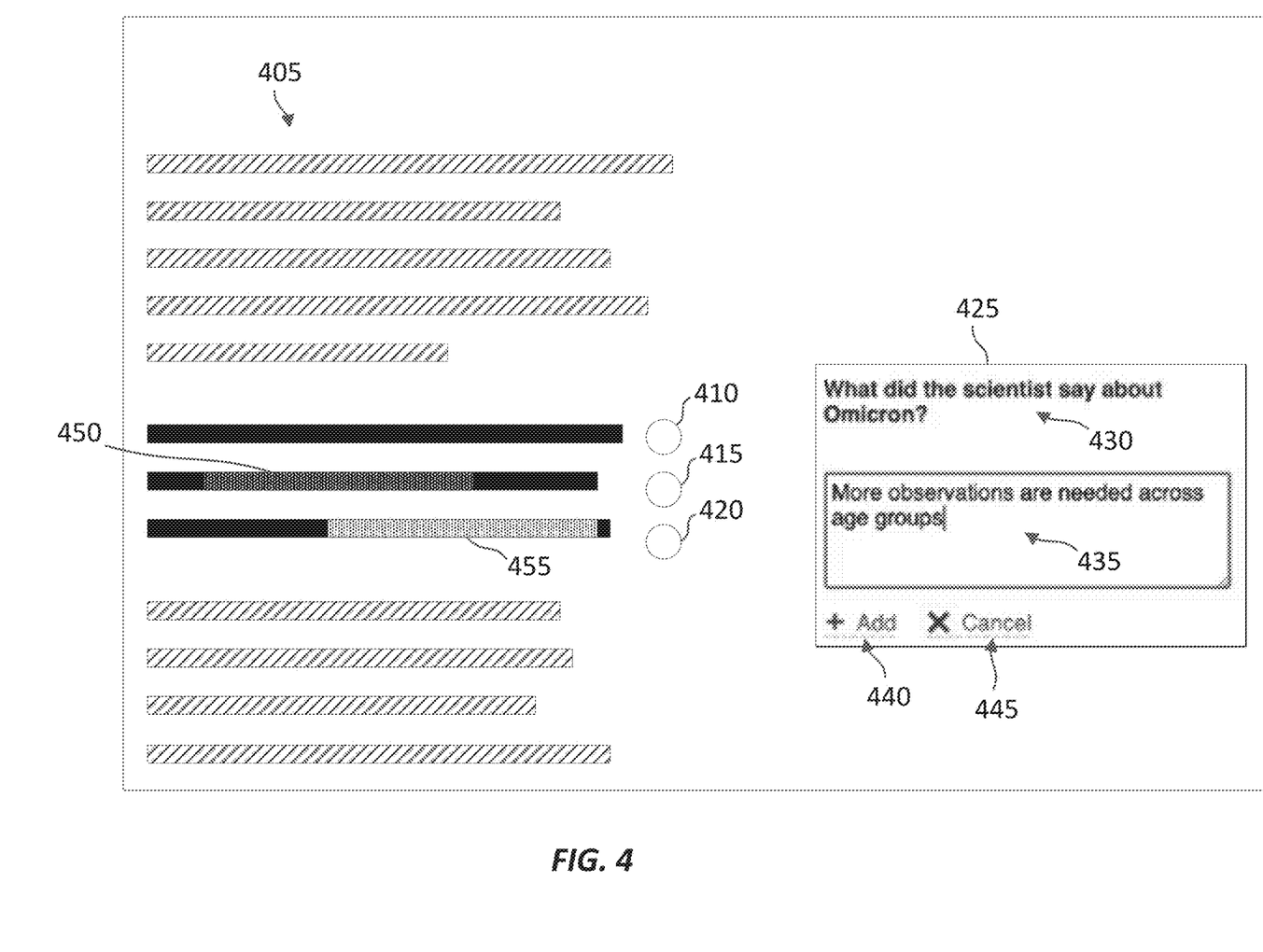
FIG. 4 illustrates an exemplary user interface for a focus mode according to some embodiments.

FIG. 4 illustrates an exemplary user interface for a focus mode according to some embodiments. While using focus mode, a number of features are available to modify the display of the text 405. As illustrated in FIG. 4, the solid black lines represent text displayed normally without any highlights or obscuring. While in focus mode, only one portion (e.g., paragraph) is displayed at a time, while the remainder of the document is obscured, as illustrated by the diagonal cross hatch. The obscuring may be achieved by reducing the opacity, blurring, dimming, etc. When a time filter or question filter is used, in addition to displaying only one portion at a time, specific sections may be highlighted according to the time or question filter, as shown by exemplary filter highlight 450. In some embodiments, a user may also highlight portions of the text while reading the document as shown by user highlight 455.

User interface button 410 may be used to turn on the user highlighting tool. User interface button 415 may open a dialog allowing a user to input a note about the paragraph that is currently displayed. User interface button 420 may be used to open a reflection question dialog 425. Reflection question dialog 425 may display a question 430 that is generated by a model which generates a question associated with the current paragraph. The model may have more of the text than just the displayed portion as inputs, with special distinction or weight given to the current paragraph. The user may then input their answer 435 into reflection question dialog 425. Add button 440 may cause the system to generate an additional reflection question. Cancel button 445 may cause the system to close the reflection question dialog 425.

Advancing the currently displayed portion of the text may be achieved by a user command such as pressing a specific button on a keyboard (e.g., the down button), or through an additional button on the user interface which is not illustrated here. In some embodiments, a separate button is used to return to a previous paragraph (e.g., the up button). In some embodiments, focus mode also displays pause and resume buttons, allowing the user to pause and resume the reading of the text. This may affect, for example, the measured dwell time by not counting the time while paused towards the dwell time of the currently displayed portion. In some embodiments, pausing focus mode reverts the display to the normal operation which displays the entire text.

Figure 5:
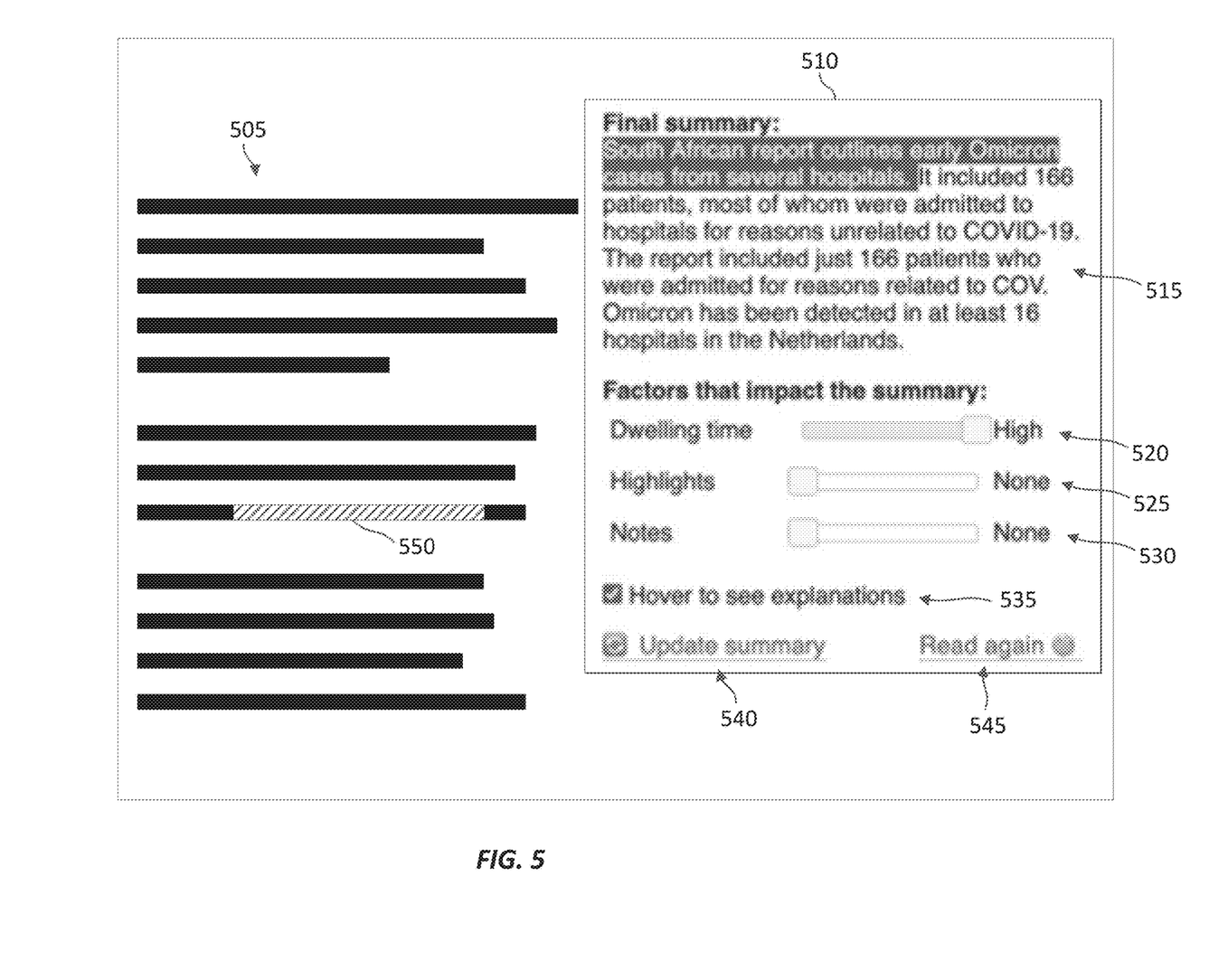
FIG. 5 illustrates an exemplary user interface for a generated summary according to some embodiments.

FIG. 5 illustrates an exemplary user interface for a generated summary according to some embodiments. A user may click a finish button (not illustrated) which causes the system to generate a summary. In some embodiments, the summary is generated when the user completes reading the article without pressing a finish button. The summary first generated may be a universal summary that does not depend on any user input, only based on the document itself. As described below, adjustments and inputs made by a user may affect subsequent generated summaries. For example, text 505 may include user highlights 550. In addition, the user may have input notes while using a focus mode. As discussed below, these may impact the generated summary.

Final summary dialog 510 may illustrate a summary 515. Slider 520 may be used to adjust the weight of the dwelling time measurements towards generating the final summary 515. Slider 525 may be used to adjust the weight of the highlights towards generating the final summary 515. Slider 530 may adjust the weight of the user notes towards generating the final summary. When a slider is adjusted, the summary may be regenerated based on the current slider positions. When check box 535 is selecting, hovering a cursor over sentences in the summary will display an explanation of the inclusion of that sentence in the summary. For example, the explanation may indicate a user note, user highlight, or indicate the portion of the text from which that sentence of the summary was derived. In some embodiments, the explanation may be generated post-hoc, and not be directly related to the actual generation of the summary.

Update summary button 540 may be used to regenerate the summary after the user has adjusted the weights using sliders 520, 525, and 530. Read again button 545 may start the focus mode reading back at the start of the document. In some embodiments, user highlighting, notes, and reflection question responses are retained. In other embodiments, starting the document at the beginning using the read again button 545 clears all or a subset of user inputs.

Figure 6:
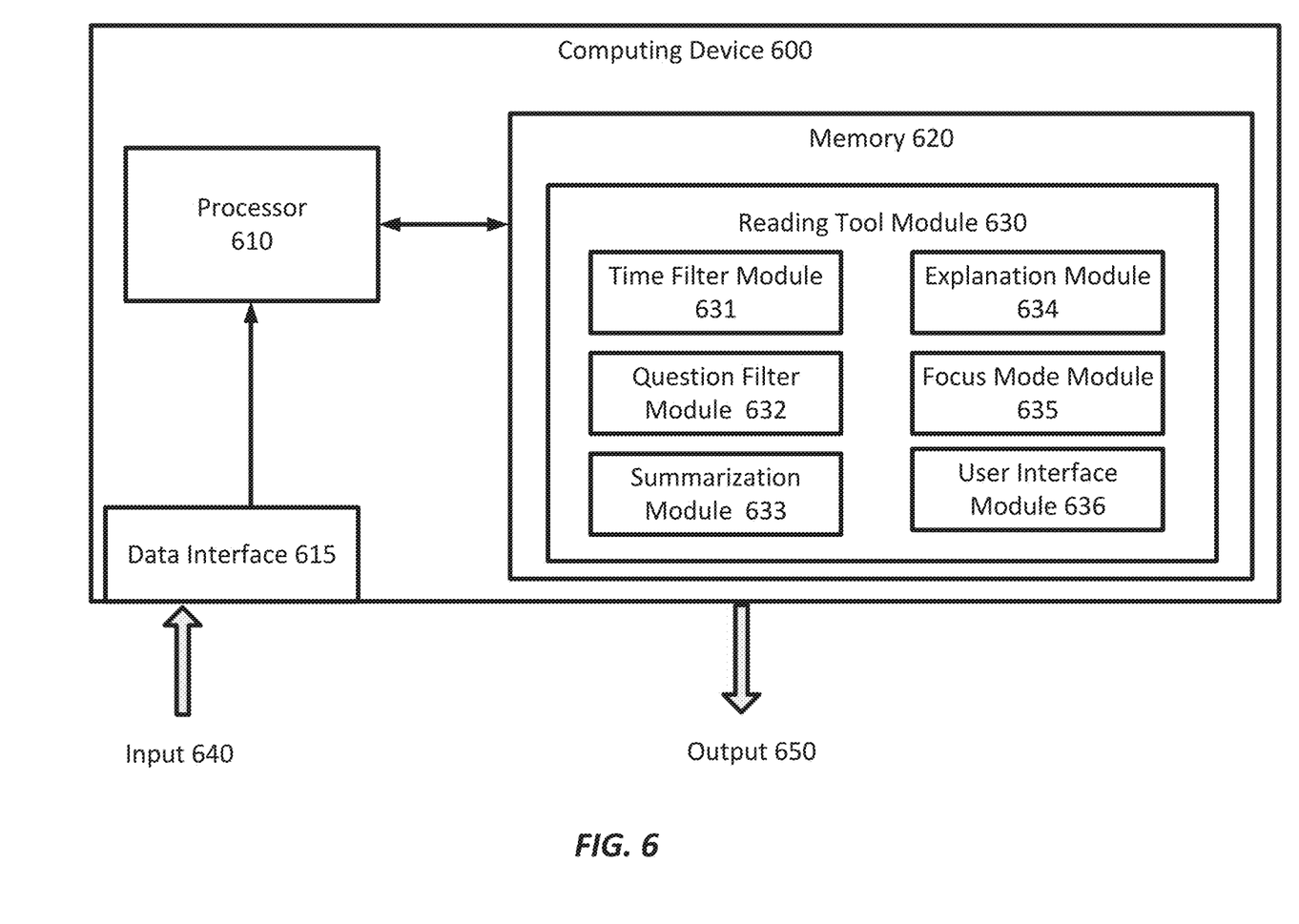
FIG. 6 is a simplified diagram of a computing device that performs document reading assistance according to some embodiments.

FIG. 6 is a simplified diagram of a computing device that implements the document summarization, according to some embodiments described herein. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for a reading tool module 630 that may be used to implement and/or emulate the systems and models, and/or to implement any of the methods described further herein. In some examples, the reading tool module 630, may receive an input 640, e.g., such as a text document, via a data interface 615. The data interface 615 may be a communication interface that may receive or retrieve previously stored documents from a database. The reading tool module 630 may generate an output 650, such as a summary of the input 640, and corresponding explanation of the summary. In some embodiments, the reading tool module 630 may further include the time filter module 631, question filter module 632, summarization module 633, explanation module 634, focus mode module 635, and user interface module 636.

Figure 7:
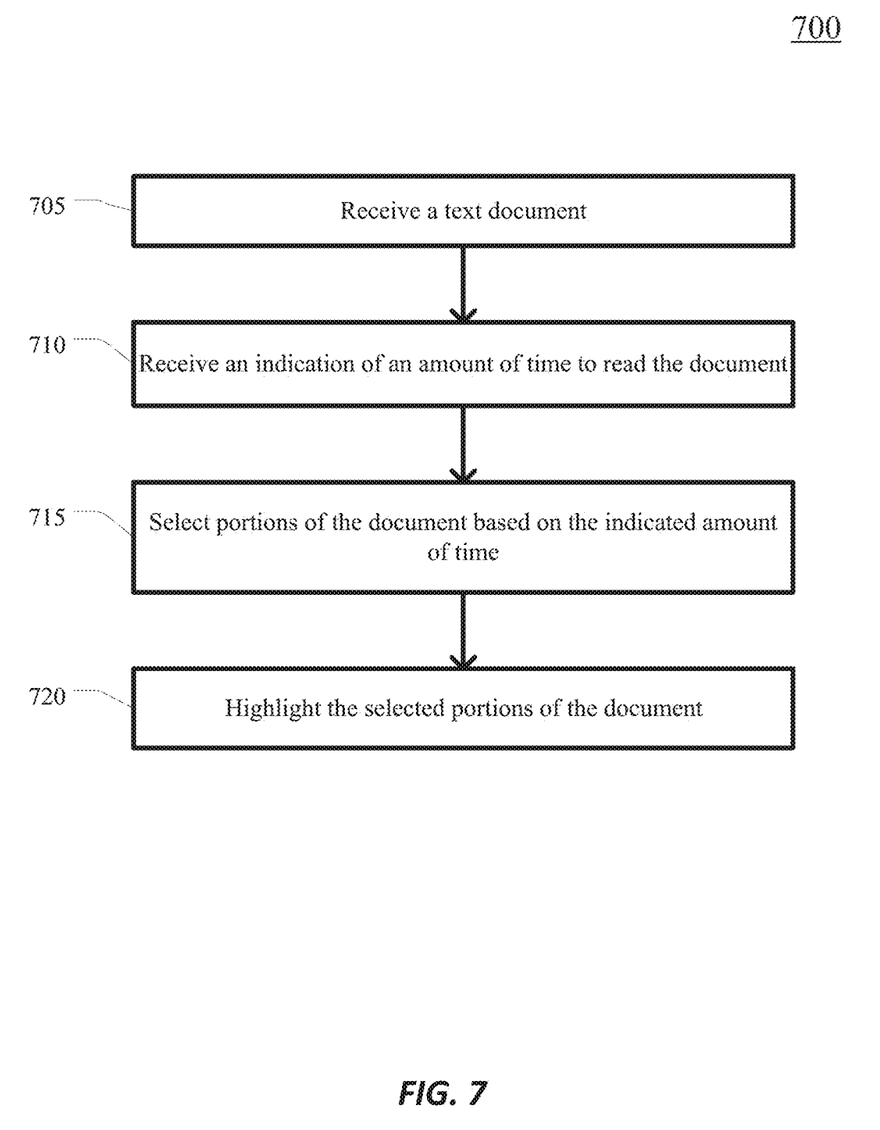
FIGS. 7-9 provide example logic flow diagrams illustrating example algorithms for a reading assistance system according to some embodiments.

The time filter module 631 is configured to perform functions as described with respect to FIG. 2 and FIG. 7. For example, time filter module 631 may present a dialog allowing a user to select an amount of time to read a document. Time filter module 631 may then highlight portions of the text document based on the user input.

Figure 8:
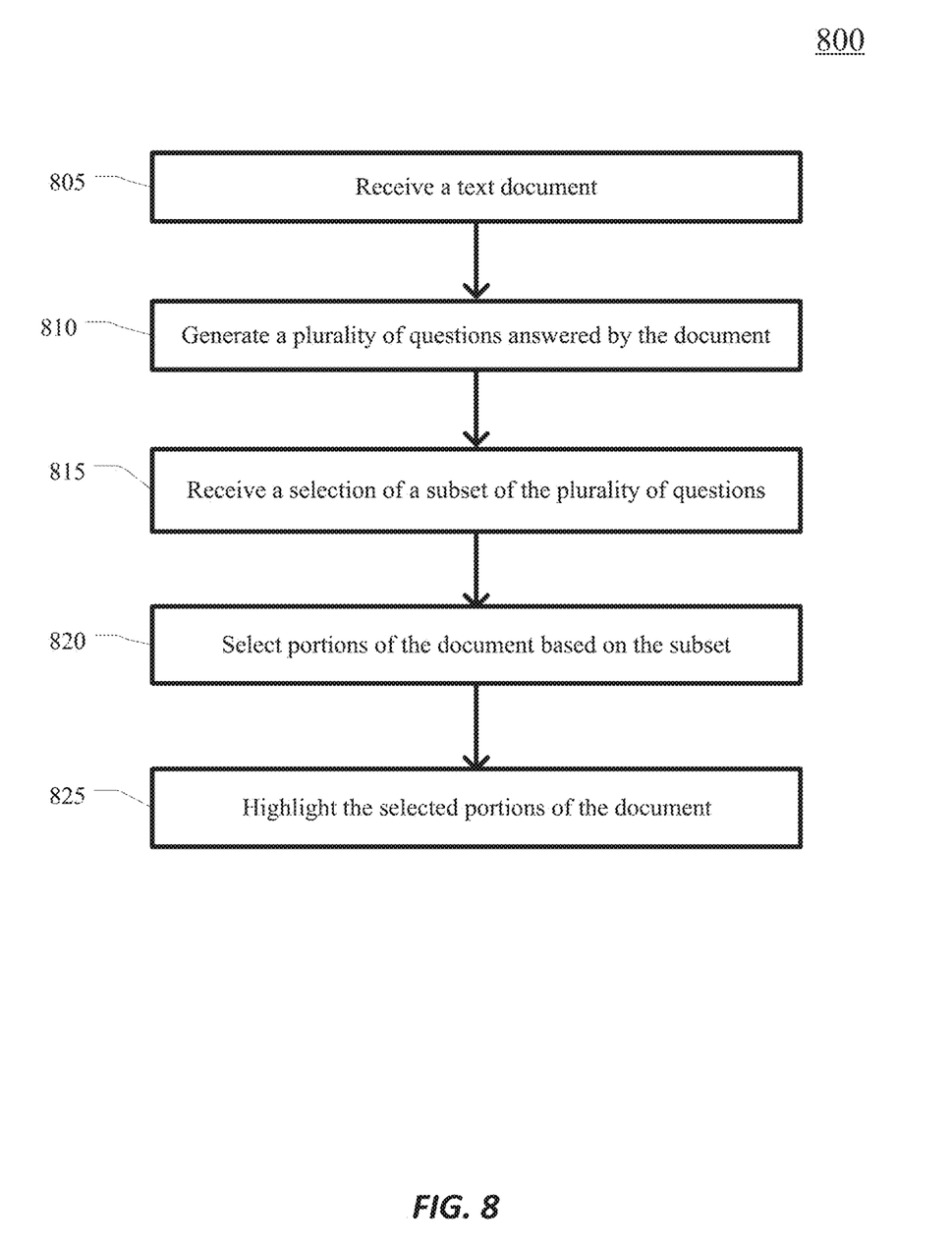

The question filter module 632 is configured to perform functions as described with respect to FIG. 3A and FIG. 8. For example, question filter module 632 may present a dialog allowing a user to select questions from a list of questions about the document. Question filter module 632 may generate the list of questions based on a model. Question filter module 632 may then highlight portions of the text document based on the user input.

Figure 9:
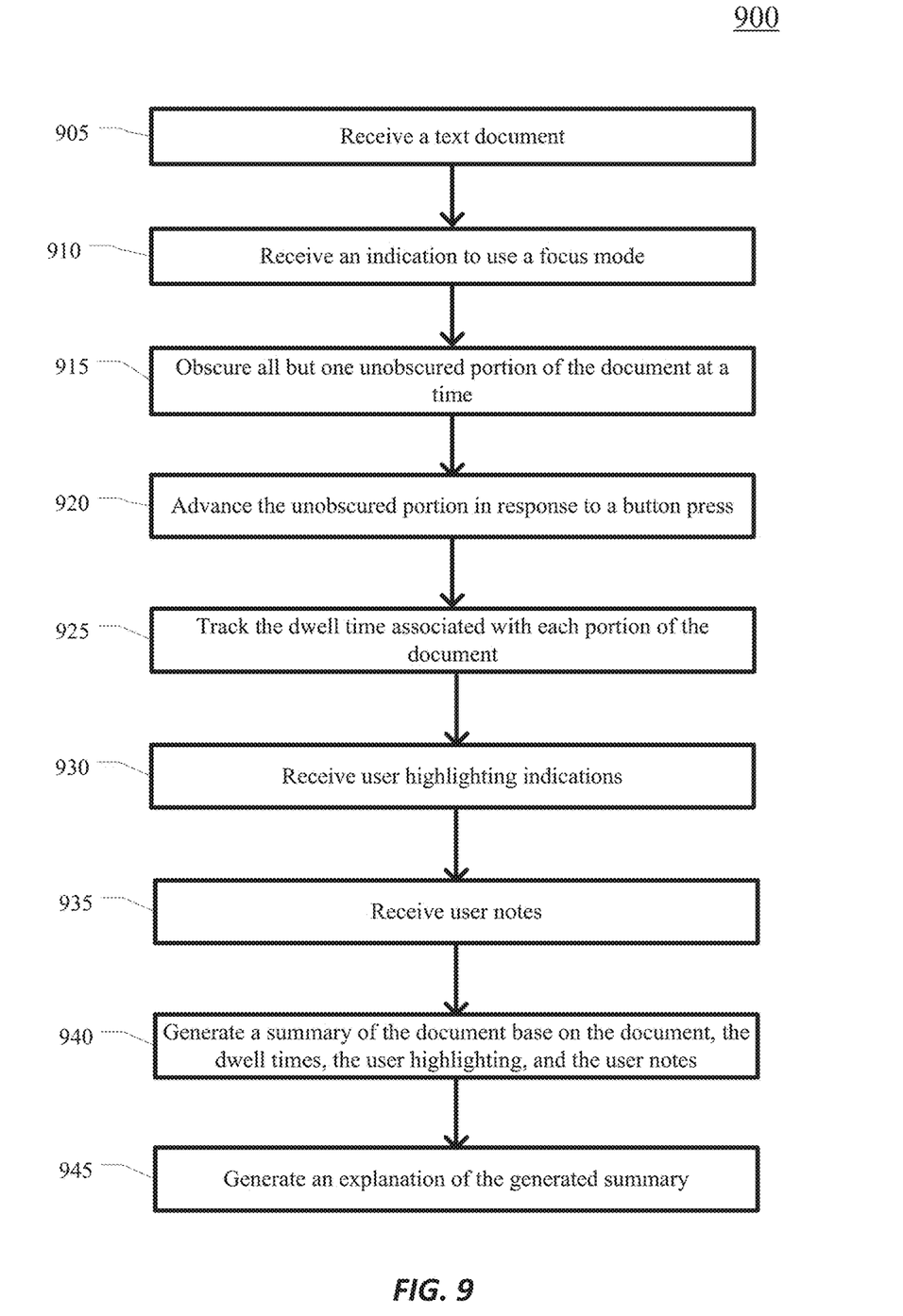
Figure 10:
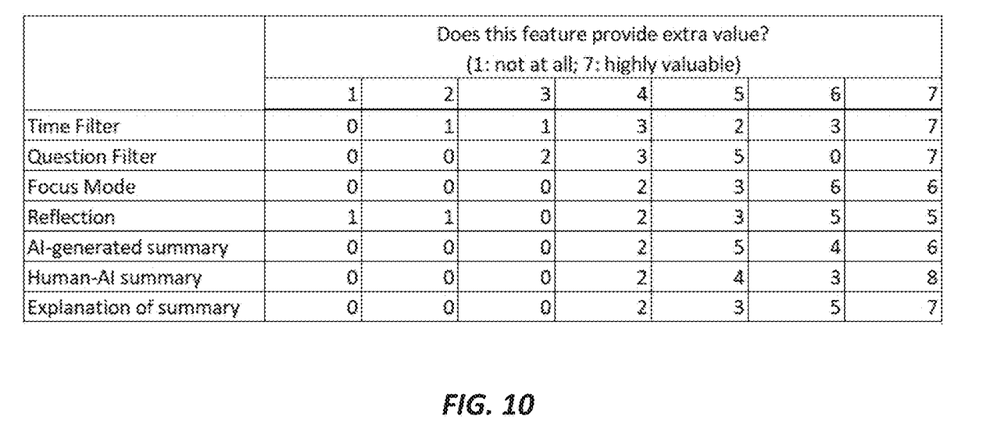
FIGS. 10-11 provide example tables illustrating example performance of different features according to some embodiments.
Figure 11:
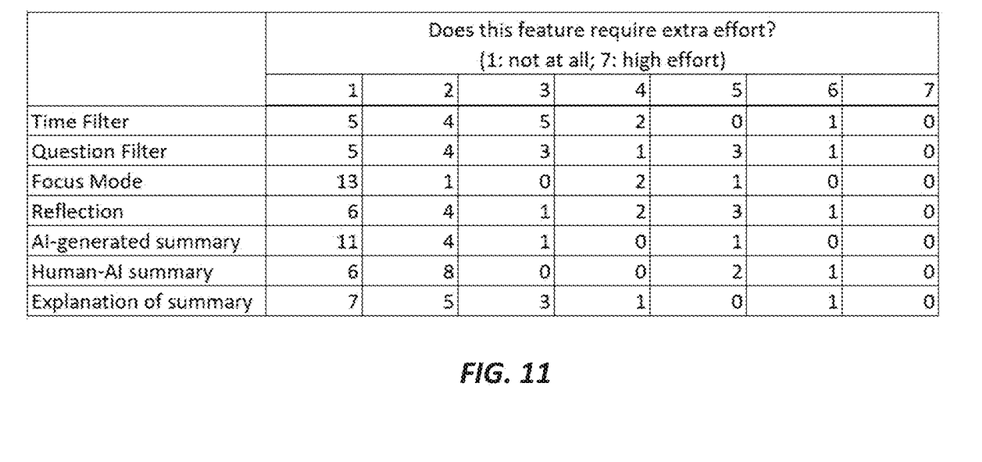

The summarization module 633 is configured to perform functions as described with respect to FIG. 5 and FIG. 9. For example, summarization module 633 may generate a summary of the document using a model with only the document as an input. Further, summarization module 633 may use explicit and implicit user information to inform the summary such as user highlights, user notes, and dwell time measurements. Summarization module 633 may present a dialog that allows a user to select how much each of the user data inputs affects the generated summary.

The explanation module 634 is configured to provide an explanation of the generated summary as described with respect to FIG. 9. Explanation module 634 may, for example, provide a location in the document which was the primary source of information for a particular sentence of the summary.

The focus mode module 635 is configured to perform functions as described with respect to FIG. 4. For example, focus mode module 635 is configured to present one paragraph of the document at a time. Focus mode module 635 allows user highlighting of the text. Focus mode module 635 may also present a dialog for a user to input notes. Focus mode module 635 may also generate and present a reflection question for a paragraph of the document. Dwell time may be tracked by focus mode module 635.

The user interface module 636 is configured to display the text of the document. The other modules of reading tool module 630 provide information to user interface module 636, which user interface module 636 uses to communicate with a physical display device such as a computer monitor in order to display the user interface to a user. User interface module 636 may adjust how items are presented based on attributes of the display being used. For example, on a small mobile device with a small screen, the dialogs may be displayed without also simultaneously displaying the document text. In some embodiments, output 650 is display information from user interface module 636. In some embodiments, output 650 is higher level information about the article which another device may use to display the modified document.

Some examples of computing devices, such as computing device 600 may include non-transitory, tangible, machine readable media that include executable code that when run by one or more processors (e.g., processor 610) may cause the one or more processors to perform the processes of methods described herein. Some common forms of machine-readable media that may include the processes of methods described herein are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 7 provides an example logic flow diagram 700 illustrating an example algorithm for a reading assistance system, according to some embodiments. One or more of the processes described in FIG. 7 may be implemented, at least in part, in the form of executable code stored on non-transitory, tangible, machine-readable media that when run by one or more processors may cause the one or more processors to perform one or more of the processes 705-720. In some embodiments, method 700 may correspond to the method used by the time filter module 631 in FIG. 6.

At step 705, a communication interface receives a text document.

At step 710, a communication interface receives an indication of an amount of time to read the document.

At step 715, a system implementing a model selects portions of the document based on the indicated amount of time. The system estimates the total reading time T of an article based on an averaged reading speed, for example 150 words per minute. The reader's specified time limit t is used to compute a compression rate (t/T), which then serves as a parameter for an extractive summarization model that ranks all input sentences. In some embodiments, the user may provide an estimate of their reading speed which is used in place of the average reading speed. One example of an extractive summarization model that may be used during the training process is a BERT model as described in Devlin et al., Bert: Pre-training of deep bidirectional transformers for language understanding, arXiv preprint arXiv:1810.04805, 2018. The BERT model may be used for text embeddings and K-Means clustering to identify sentences closest to the centroid for each of the annotated summary sentences. The extractive summarization model will then return a set of sentences which are a subset of the source document and whose total length is equal to or smaller than t/T of the entire text's length.

At step 720, the system highlights the selected portions of the document.

FIG. 8 provides an example logic flow diagram 800 illustrating an example algorithm for a reading assistance system, according to some embodiments. One or more of the processes described in FIG. 8 may be implemented, at least in part, in the form of executable code stored on non-transitory, tangible, machine-readable media that when run by one or more processors may cause the one or more processors to perform one or more of the processes 805-825. In some embodiments, method 800 may correspond to the method used by the question filter module 632 in FIG. 6.

At step 805, a communication interface receives a text document.

At step 810, a system implementing a model generates a plurality of questions answered by the document. One example of a question generation (QG) model that the system may employ is MixQG described in Murakhovs'ka et al., MixQG: Neural Question Generation with Mixed Answer Types, arXiv preprint arXiv:2110.08175, 2021. MixQG is based on a large-scale pretrained model named T5 described in Raffel et al., Exploring the limits of transfer learning with a unified text-to-text transformer, arXiv preprint arXiv:1910.10683, 2019. The T5 model may be further fine-tuned on a number of datasets. MixQG takes two parameters as inputs to generate a question. First, the text that a question will be asked about and second, the text span that will serve as an answer to a desired question. Specifically, the system uses the text of the entire article as the first parameter. For the second parameter, the system uses the text of each paragraph, or extractive summaries of each paragraph. Paragraphs that are shorter than a pre-defined threshold (for example, word count<32) may be merged with the subsequent paragraph (if there is any). In this way, each generated question can often be answered by reading one specific paragraph (sometimes multiple ones if they are short).

At step 815, a communication interface receives a selection of a subset of the plurality of questions.

At step 820, the system selects portions of the document based on the subset. This may be done by selecting the paragraph used at step 810 for the generation of each respective selected question.

At step 825, the system highlights the selected portions of the document.

FIG. 9 provides an example logic flow diagram 900 illustrating an example algorithm for a reading assistance system, according to some embodiments. One or more of the processes described in FIG. 9 may be implemented, at least in part, in the form of executable code stored on non-transitory, tangible, machine-readable media that when run by one or more processors may cause the one or more processors to perform one or more of the processes 905-945. In some embodiments, method 900 may correspond to the method used by the summarization module 633, explanation module 634, and focus mode module 635 in FIG. 6. Processes described in FIG. 9 may be used together in combination with processes described in FIGS. 7-8.

At step 905, a communication interface receives a text document.

At step 910, a communication interface receives an indication to use a focus mode. For example, based on a user selecting focus mode selector 225 or 325.

At step 915, a system obscures all but one unobscured portion of the document at a time.

At step 920, the system advances the unobscured portion in response to a button press. The button press may be, for example, a key on a keyboard or a virtual button on a display. An input may also be used to move back to a prior portion of the document. For example, A user can use up/down arrow keys to go to the next or previous paragraph. The user can also click 'Pause/Resume' to switch between the focus mode and the normal view of the article.

At step 925, the system tracks the dwell time associated with each portion of the document. The system may have a clock, or access to the time from an external clock, which allows the system to keep track of the amount of time (dwell time) spent on each paragraph. A counter may start tracking the time when a paragraph of the text is unobscured and stop tracking the time when that paragraph is obscured. The dwell time may include the time spent reading the paragraph, as well as time spent highlighting, taking notes, or using other features made available by the system.

At step 930, a communication interface receives user highlighting indications.

At step 935, a communication interface receives user notes. Each note may be associated with a paragraph of the text.

At step 940, the system implementing a model may generate a summary of the document based on the document, the dwell times, the user highlighting, and the user notes. First, the system may generate a summary using only the document itself using an abstractive summarization model. While extractive methods summarize text using a subset of its sentences, an abstractive summarizer generates new (and often shorter) text that carries the most important information from the original text.

The system may use the standard Transformers encoder-decoder architecture to generate an abstractive summary. The decoder may, for example, be a decoder such as RoBERTa as described in Liu et al., Roberta: A robustly optimized bert pretraining approach, arXiv preprint arXiv: 1907.11692, 2019. The system may then fine-tune the summarizer on a summarization dataset with a cross-entropy loss, the dataset being for example the CNN/Daily Mail summarization dataset as described in Nallapti et al., Abstractive Text Summarization using Sequence-to-sequence RNNs and Beyond, Proceedings of the $20^{th}$ SIGNLL Conference on Computational Natural Language Learning, pages 280-290, 2016. In some embodiments, the system uses a decoder such as Longformer as described in Betalgy et al., Longformer: The Long-Document Transformer, arXiv:2004.05150, 2020. Longformer can take eight times more tokens as input than the BERT encoder.

Beyond the one-size-fits-all summary, the system further allows the user to personalize the AI-generated summary based on two implicit and explicit generated user data. Implicitly generated user data includes the user's dwelling time on each paragraph, which the system may use to weigh the paragraph's importance. To factor in different lengths across paragraphs, the system may calculate reading speed for each paragraph (number of words divided by dwelling time): the more time a user spends per word in a paragraph, the more likely that paragraph will contribute to the generated summary. Explicitly generated user data includes the reader's notes and highlighted sentences. The notes and highlights may be included as additional content to the original text. The combined text is then fed to the model to produce an abstractive summary.

For each type of user-generated data, the reader can choose a level of impact on the summary, for example none, low, or high. To incorporate dwelling time into the summary, the system may normalize the reading speed and map it to weights for each paragraph. The system may then use the abstractive model with these weights by element-wise multiplying them to the latent encoder representations of each paragraph before they are fed to the decoder. Note that in this way the system may manipulate the output summary by adjusting its encoder's latent space implicitly without the need to collect personalized summaries as training data. To determine the range of weight values, in some embodiments, they system may use an exponential mapping from time-per-word to weight so that paragraphs with greater dwelling time would stand out more and vice versa.

To incorporate notes and user-highlighted sentences, the system may insert each note or highlighted sentence as new paragraphs immediately after the original paragraph wherein they were generated. Then such user-generated data is treated the same as the other paragraphs by the summarization model. The levels of impact are mapped to specific weight values for the paragraphs of highlights or notes, for example: none=0.6, low=1.0, and high=1.4.

The summarization model may be a generative summarization model that receives an input of the unobscured portions of the document, dwell time on each of respective portion, user notes and other user interaction parameters, and generate an output summary. This generative summarization model may be trained with document data and associated reference summaries. In another embodiment, user interaction history may be used as part of the training data supervised by the reference summaries.

At step 945, the system implementing a model generates an explanation of the generated summary. For example, a user can check the box of the 'hover to see explanation' feature. Then, as they hover a cursor over a sentence in the summary, the system locates the source of text (or user-generated data) and describes how it is correlated with the summary sentence in the explanation bubble. The system may employ a post hoc similarity-based approach to generate such explanations.

Given a hovered sentence S in the summary, the system may compute the ROUGE score as described in Lin, Rouge: A package for automatic evaluation of summaries, Text summarization branches out, pages 74-81, 2004. The ROUGE score may be computed between that sentence and each one of the original paragraphs, user-generated notes, and user-highlighted sentences. If the highest score is between S and an original paragraph, the system may first check its dwelling time (per word): if it is above the average, the system may report in the explanation "You spent more time (per word) in this paragraph than X % of the other paragraphs"; otherwise, the system may show in the explanation bubble "This paragraph is the most related." If the highest score is between S and a note or a highlighted sentence, the explanation bubble may show "You wrote a related note here: [the note]" or "You highlighted a related sentence here," or something similar.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for customized document summarization, the method comprising:
receiving an indication of a selected document that a user intends to read;
generating a set of options of comprehension levels corresponding to the selected document, each comprehension level corresponding to an amount of time or a plurality of questions based on the selected document;
receiving an indication of a comprehension level by a selection of at least one of an amount of time to read a document, or a plurality of questions expected to be answered;
determining a plurality of sections including a subset of the document based on the amount of time or the plurality of questions;
highlighting the plurality of sections;
presenting, via a user interface, the selected document while obscuring portions of the document except for an unobscured range over a focused portion of a plurality of portions of the document;
advancing the unobscured range through the plurality of portions of the document in response to an advance command;
tracking respective dwell times associated with how much time each of the plurality of portions of the document are unobscured;
receiving a highlighting indication corresponding to one or more sub-portions of the document;
receiving one or more notes associated with respective portions of the plurality of portions; and
generating a summary of the selected document according to the respective dwell times, the highlighting indication, and the one or more notes.

2. The method of claim 1, wherein a respective weight is associated with the respective dwell times, the highlighting indication, and the one or more notes, the respective weights adjusting a contribution to the generated summary.

3. The method of claim 1, further comprising:
generating an explanation of the generated summary.

4. The method of claim 3, wherein the explanation is based on a post hoc determination of similarity between each respective sentence of the generated summary and text from the document.

5. The method of claim 1, wherein the plurality of sections are determined based on an extractive summarization model, and wherein an input to the extractive summarization model is a compression rate based on the amount of time.

6. The method of claim 1, wherein the plurality of questions are generated based on a model, wherein a first input to the model is the selected document, and wherein a second input to the model is a portion of the selected document.

7. The method of claim 1, further comprising:
generating a reflection question associated with the document.

8. A system for document summarization, the system comprising:
a memory that stores a summarization model;
a communication interface that receives an indication of a selected document that a user intends to read; and
one or more hardware processors that:
generates a set of options of comprehension levels corresponding to the selected document, each comprehension level corresponding to an amount of time or a plurality of questions based on the selected document;

receives an indication of a comprehension level by a selection of at least one of an amount of time to read a document, or a plurality of questions expected to be answered;

determines a plurality of sections including a subset of the document based on the amount of time or the plurality of questions;

highlights the plurality of sections;

presents, via a user interface, the selected document while obscuring portions of the document except for an unobscured range over a focused portion of a plurality of portions of the document;

advances the unobscured range through the plurality of portions of the document in response to an advance command;

tracks respective dwell times associated with how much time each of the plurality of portions of the document are unobscured;

receives a highlighting indication corresponding to one or more sub-portions of the document;

receives one or more notes associated with respective portions of the plurality of portions; and generates a summary of the selected document according to the respective dwell times, the highlighting indication, and the one or more notes.

9. The system of claim 8, wherein a respective weight is associated with the respective dwell times, the highlighting indication, and the one or more notes, the respective weights adjusting a contribution to the generated summary.

10. The system of claim 8, further, wherein the one or more hardware processors are further configured to generate an explanation of the generated summary.

11. The system of claim 10, wherein the explanation is based on a post hoc determination of similarity between each respective sentence of the generated summary and text from the document.

12. The system of claim 8, wherein the plurality of sections are determined based on an extractive summarization model, and wherein an input to the extractive summarization model is a compression rate based on the amount of time.

13. The system of claim 8, wherein the plurality of questions are generated based on a model, wherein a first input to the model is the selected document, and wherein a second input to the model is a portion of the selected document.

14. The system of claim 8, wherein the one or more hardware processors are further configured to generate a reflection question associated with the document.

15. A processor-readable non-transitory storage medium storing a plurality of processor-executable instructions for a summarization model, the instructions being executed by a processor to perform operations comprising:

receiving an indication of a selected document that a user intends to read;

generating a set of options of comprehension levels corresponding to the selected document, each comprehension level corresponding to an amount of time or a plurality of questions based on the selected document;

receiving an indication of a comprehension level by a selection of at least one of an amount of time to read a document, or a plurality of questions expected to be answered;

determining a plurality of sections including a subset of the document based on the amount of time or the plurality of questions;

highlighting the plurality of sections;

presenting, via a user interface, the selected document while obscuring portions of the document except for an unobscured range over a focused portion of a plurality of portions of the document;

advancing the unobscured range through the plurality of portions of the document in response to an advance command;

tracking respective dwell times associated with how much time each of the plurality of portions of the document are unobscured;

receiving a highlighting indication corresponding to one or more sub-portions of the document;

receiving one or more notes associated with respective portions of the plurality of portions; and generating a summary of the selected document according to the respective dwell times, the highlighting indication, and the one or more notes.

16. The processor-readable non-transitory storage medium of claim 15, wherein a respective weight is associated with the respective dwell times, the highlighting indication, and the one or more notes, the respective weights adjusting a contribution to the generated summary.

17. The processor-readable non-transitory storage medium of claim 15, further comprising:

generating an explanation of the generated summary.

18. The processor-readable non-transitory storage medium of claim 17, wherein the explanation is based on a post hoc determination of similarity between each respective sentence of the generated summary and text from the document.

19. The processor-readable non-transitory storage medium of claim 15, wherein the plurality of sections are determined based on an extractive summarization model, and wherein an input to the extractive summarization model is a compression rate based on the amount of time.

20. The processor-readable non-transitory storage medium of claim 15, wherein the plurality of questions are generated based on a model, wherein a first input to the model is the selected document, and wherein a second input to the model is a portion of the selected document.

* * * * *